(12) United States Patent
Eckersley et al.

(10) Patent No.: US 6,580,470 B1
(45) Date of Patent: Jun. 17, 2003

(54) DISPLAY APPARATUS FOR DISPLAYING AN IMAGE REPRESENTATIVE OF AN INTERLACED VIDEO SIGNAL

(75) Inventors: Brian Eckersley, Worsley (GB); Paul Thomas Doran, Middleton (GB)

(73) Assignee: Digital Projection Limited, Manchester (GB)

( * ) Notice: Subject to any disclaimer, the term of this patent is extended or adjusted under 35 U.S.C. 154(b) by 0 days.

(21) Appl. No.: 09/355,924

(22) PCT Filed: Feb. 12, 1998

(86) PCT No.: PCT/GB98/00447

§ 371 (c)(1),
(2), (4) Date: Oct. 19, 1999

(87) PCT Pub. No.: WO98/36567

PCT Pub. Date: Aug. 20, 1998

(30) Foreign Application Priority Data

Feb. 12, 1997 (GB) ............................................. 9703107

(51) Int. Cl.⁷ ............................. H04N 7/01; H04N 5/74
(52) U.S. Cl. ........................ 348/771; 348/759; 348/448; 348/452

(58) Field of Search .................................. 348/759, 771, 348/770, 448, 451, 452; H04N 7/01, 5/74

(56) References Cited

U.S. PATENT DOCUMENTS

| 4,876,596 A | 10/1989 | Faroudja |
| 4,967,271 A | 10/1990 | Campbell et al. |
| 4,982,280 A | 1/1991 | Lyon et al. |
| 5,530,482 A | 6/1996 | Gove et al. |

FOREIGN PATENT DOCUMENTS

| EP | 0 123 174 | 10/1984 |
| EP | 0 740 468 | 10/1996 |
| GB | 2 178 922 | 2/1987 |

*Primary Examiner*—Sherrie Hsia
(74) *Attorney, Agent, or Firm*—Finnegan Henderson Farabow Garrett & Dunner, L.L.P.

(57) ABSTRACT

A display apparatus includes means for inputting an interlaced video signal comprising signals representative of successive fields in image data produced by scanning successive image frames. Fields of image data that have been derived from single frames of the scanned image frames are determined, and signals produced representative of each of the image frames. A DMD for each color channel is addressed with signals representative of the frames.

24 Claims, 8 Drawing Sheets

DISPLAY APPARATUS FOR DISPLAYING AN IMAGE REPRESENTATIVE OF AN INTERLACED VIDEO SIGNAL

BACKGROUND OF THE INVENTION (1) Field of the Invention

This invention relates to display apparatus. In particular the invention relates to display apparatus in which an interlaced scan video signal derived from a film source, using for example a telecine scanner, is used to address a progressively scanned spatial light modulator, for example an array of electrically deflectable mirrors. Such an array of mirrors is commonly known, when addressed with digital signals as a digital mirror device, but is also referred to as a deformable or deflectable mirror device, or DMD.

The video signals conforming to most transmission standards, including the PAL, NTSC and SECAM standards, are formatted in an interlaced scan mode intended for use with a scanned display system, for example a display system using a cathode ray tube such as in domestic television systems or in some projector systems. To produce such interlaced video signals, each image frame is divided into two fields, the first field of each image frame being designated an "odd" field and comprising all the odd numbered horizontal lines scanned across the image frame, and the second field being designated an "even" field and comprising all the even numbered lines. When the video signal is used to drive a scanned display system such as a television receiver, the two fields of each frame are displayed in the same sequence in which they were recorded, and are integrated by the eyes of the observer who will observe the reconstituted image frame.

Digital mirror devices comprise an array of deflectable mirror elements, each mirror element including a mirror surface mounted on a torsion element over a control electrode. Applying an electrical potential to each control electrode causes the associated mirror surface to pivot, thus changing the direction of light reflected from the mirror element. By application of suitable electrical address signals to the digital mirror device, selected mirror elements will reflect light in either an "on" direction towards a projector lens for projection onto a display screen, or an "off" direction towards a beam dump. It is thus possible to spatially modulate a beam of light incident on the digital mirror device to produce a projected image on a display screen. The pixels of the image displayed on the display screen will be produced by light reflected from one or more of the mirror elements.

Unlike cathode ray tube based systems such as television receivers which use such interlaced address signals, display systems using digital mirror devices display a full frame of information every field interval, all the pixels representing the frame being illuminated simultaneously rather than scanned as in a cathode ray tube. In its simplest form, each pair of successive fields may be combined to produce a complete frame which may be displayed by the digital mirror device. This is commonly known as interlaced to rolling field progressive scan conversion and is illustrated in FIG. 1. As can be seen from FIG. 1, the data in each pair of successive fields is combined to produce a frame of data which is then displayed. Thus the "odd" and "even" fields of data from the first frame are combined to produce the first frame to be displayed. The second frame to be displayed comprises the "even" field of the first frame, together with the "odd" field of the second frame. The third frame to be displayed comprises the data from the "odd" and "even" fields of the second frame. The fourth frame to be displayed comprises the data from the "even" field of the second frame and the "odd" field of the third frame, and so on. By such an arrangement a "smoothed" image is produced.

Where such an interlaced scan video signal is used to address a digital mirror device, because the pairs of successive fields are displayed simultaneously rather than sequentially as in a cathode ray tube, in the case of images of objects which have moved between the time of recording the two fields the time lapse between, subsequent fields in each frame will create a double image.

In order to overcome this problem of double images in a camera derived signal where there has been movement of the image between successive fields, it is known to convert the interlaced scan video signal, after being digitized into pixel values for each mirror element of the digital mirror device, providing interpolated lines of pixel values by interpolating the missing lines from the most recently received field and then combining them with the most recently received field into a complete frame of pixel values. Comparison of the interpolated field with the field immediately prior to the most recent field may be employed to establish the existence of motion between successive fields and hence can be used to determine which of the preceding and interpolated fields are used to make up the complete frame. This conversion of fields to frames is known as "motion adaptive progressive scan conversion" and is illustrated schematically in FIG. 2 which shows the interpolated fields used in such a progressive scan conversion where there has been movement of the image between successive fields.

(2) Description of Related Art

An example of the use of an interlaced scan video signal to address a digital mirror device after conversion to a progressive scan is shown in U.S. Pat. No. 5530482 in which a staggered mirror device pattern is used to improve the perceived horizontal resolution of the display system.

EP-A-0740468 discloses a television receiver in which an interlace to progressive scan conversion takes place in order to enable a digital mirror device to display images represented by the input interlaced signals. Interpolated fields are included to compensate for the input data which is designed for use with a scanning display, such as a cathode ray tube.

Whilst, as can be seen from the prior art, it is possible to adapt interlaced television signals for use by a progressively scanned spatial light modulator such as a digital mirror device, particular problems arise when the video signal is derived from a scanned film source. Such scanning is typically performed by a telecine scanner which is used to transfer transparencies or films onto video tape by scanning the transparency or each frame of the film with a point source of light, typically a cathode ray tube, in a raster pattern. The red, green and blue light passing through the transparency or film is detected by a respective photodetector, for example a photo multiplier for each of the three primary colours, red, green and blue in combination with appropriate filters, so as to generate an analogue signal representative of each frame of the film for each colour channel. The three colour channel signals are then converted to the appropriate luminance and colour difference signals for the relevant transmission standard. The raster scan information for each film frame is separated onto an "odd" field containing all the odd numbered scan lines and an "even" field containing all the even numbered lines. Further, depending on the setting of the telecine machine, each image frame may be transmitted "odd" field first or "even" field first.

International application WO-A-92/09172 discloses an interlaced video signal derived from a film source using a telecine apparatus for use with a display system in which the display device is a digital mirror device. The video signal is arranged to incorporate a number of flags effective to denote that the video signal has been derived from a film source, and the position of the odd fields. Using this information, the display system is able to create frames for display in which only fields of data derived from the same image frame are combined into frames and displayed. However, in practice, video signals derived from film sources using, for example, a telecine apparatus do not incorporate such flags as the video signals are designed for use with a variety of display devices in which interlaced scans do not present a problem.

BRIEF SUMMARY OF THE INVENTION

It is an object of the present invention to provide a means for enabling a display apparatus using a display device such as a deformable mirror array which displays a full frame of information at every field interval using an interlaced video signal derived from a film source.

According to an aspect of the present invention there is provided a display apparatus including a spatial light modulator means for inputting an interlaced video signal produced by scanning successive image frames, the video signal comprising data signals representative of the successive image frames; means for determining from the data signals which signals have been derived from single frames of the scanned frames and producing signals representative of the frames; and a spatial light modulator drivable by said signals representative of the frames.

BRIEF DESCRIPTION OF THE DRAWINGS

A number of embodiments of the present invention will now be described by way of example only, with reference to the accompanying drawings in which.

DETAILED DESCRIPTION OF THE PREFERRED EMBODIMENTS

Figure 3:
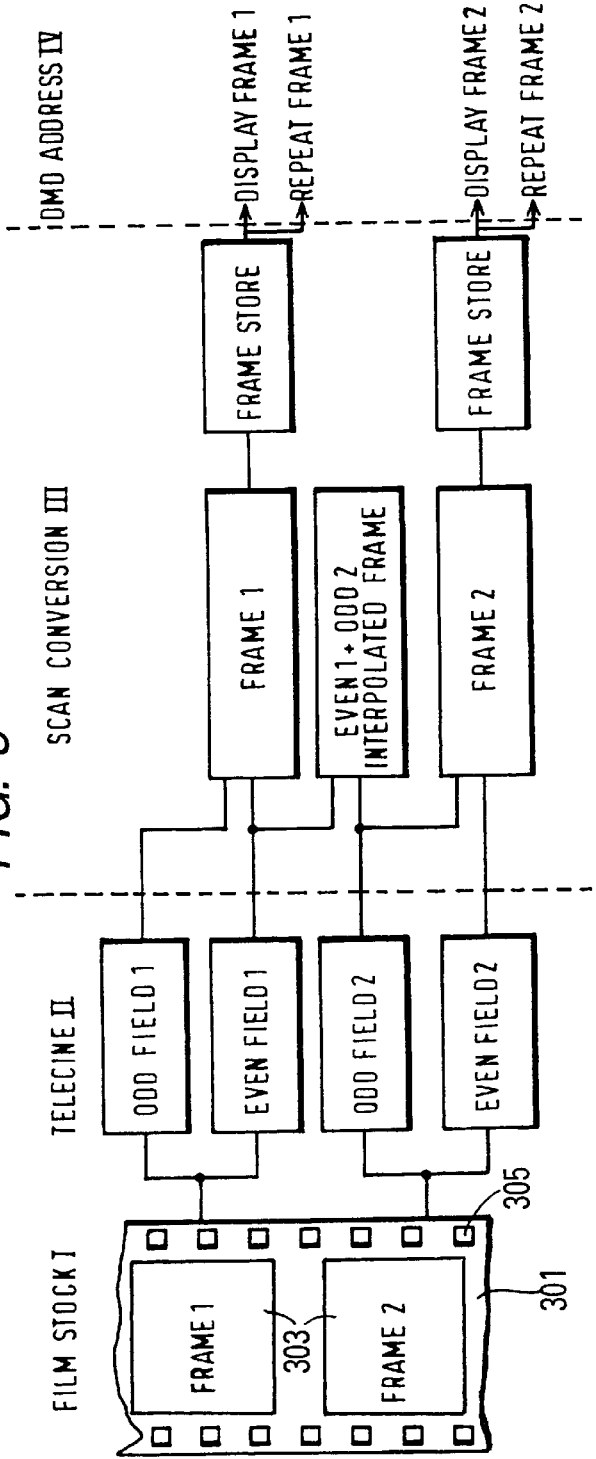
FIG. 3 is a schematic diagram illustrating the production of an interlaced video signal from a film source by a telecine scanner and the input of such a video signal to a display apparatus in accordance with an embodiment of the invention.

Referring to FIG. 3 this Figure illustrates the production of an interlaced video signal from original film stock by a telecine scanner, and the subsequent display of the images carried on the film stock by a digital mirror device. Region I represents the originating film stock, Region II represents the conversion by the telecine scanner of the information in the frames of the film to an interlaced scan video signal, Region III represents the conversion of the interlaced scan video signal to a modified progressive scan signal in accordance with an embodiment of the invention, and Region IV represents the address of a digital mirror device by the modified progressive scan signal.

As illustrated in Region I of FIG. 3, the source material comprises a cinematographic film 301 including a run of frames 303 of image data, only two frames being shown in the figure. The film 301 includes along each border alignment holes for use by the telecine scanner (not shown) in aligning the film with the cathode ray tube incorporated in the telecine scanner.

Figure 1:
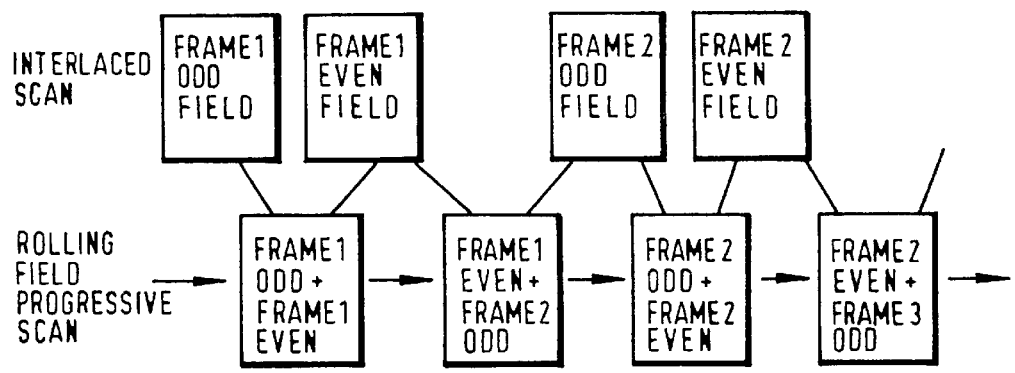
FIG. 1 is a schematic diagram illustrating interlaced scan to progressive rolling field scan conversion as described above.
Figure 4:
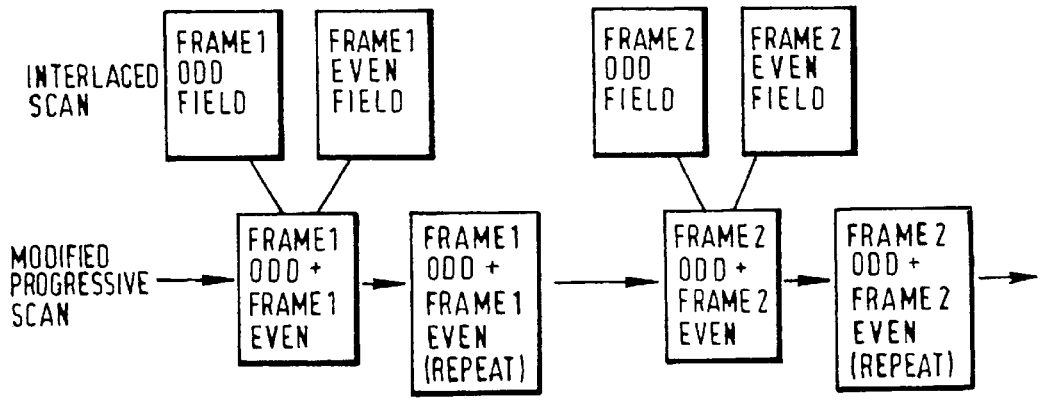
FIG. 4 illustrates the combination of successive fields into the displayed frames in accordance with the first embodiment of the present invention.
Figure 2:
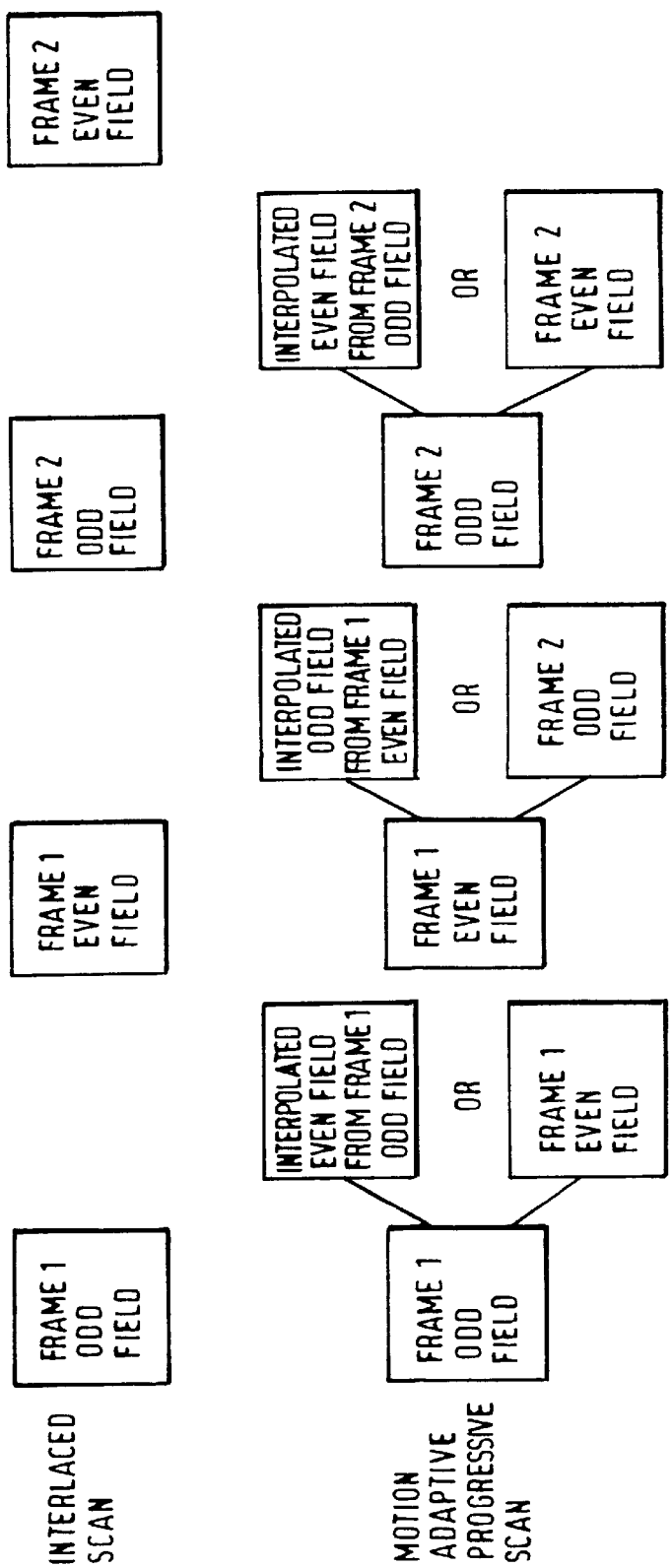
FIG. 2 is a schematic diagram illustrating interlaced scan to motion adaptive progressive scan conversion as described above.

As the cathode ray tube of the telecine scanner scans across each frame 303 of the film 301, analogue signals representative of the successive odd and even fields of data are produced as indicated in Region II of FIG. 3. As explained above in relation to FIG. 2, in the conventional interlaced scan to progressive scan conversion or motion adaptive progressive scan conversion, successive pairs of fields of data are combined to produce frames of data to be displayed. However, in accordance with the embodiments of the present invention to be described, and as also illustrated in FIG. 4 the display apparatus is arranged such that "odd" and "even" fields of data from each frame of the film are combined, whilst the intermediate frames produced by successive "even" and "odd" fields from different frames are identified by the display system and not used. Digital data representative of each frame is stored. The address system for the display device is then arranged so as to display each frame of data twice.

The signal output of the telecine scanner is of conventional television signal format and as indicated in Region II of FIG. 3 includes successive fields of analogue signals comprising successive "odd" and "even" fields of chrominance and luminance information derived from the successive frames of the cinematographic film, together with conventional line synchronization signals at the end of the signal for each scanned line and frame signals at the end of the signal for each field. In this particular example, the signal is designed for the PAL system with the luminance and chrominance signals represented by YUV data. The film 201 is scanned at a rate of 25 frames per second, with each interlace field comprising 288 lines.

The form of the display apparatus including means for performing the signal processing indicated in Regions III and IV of FIG. 3 will now be described in more detail.

Figure 5:
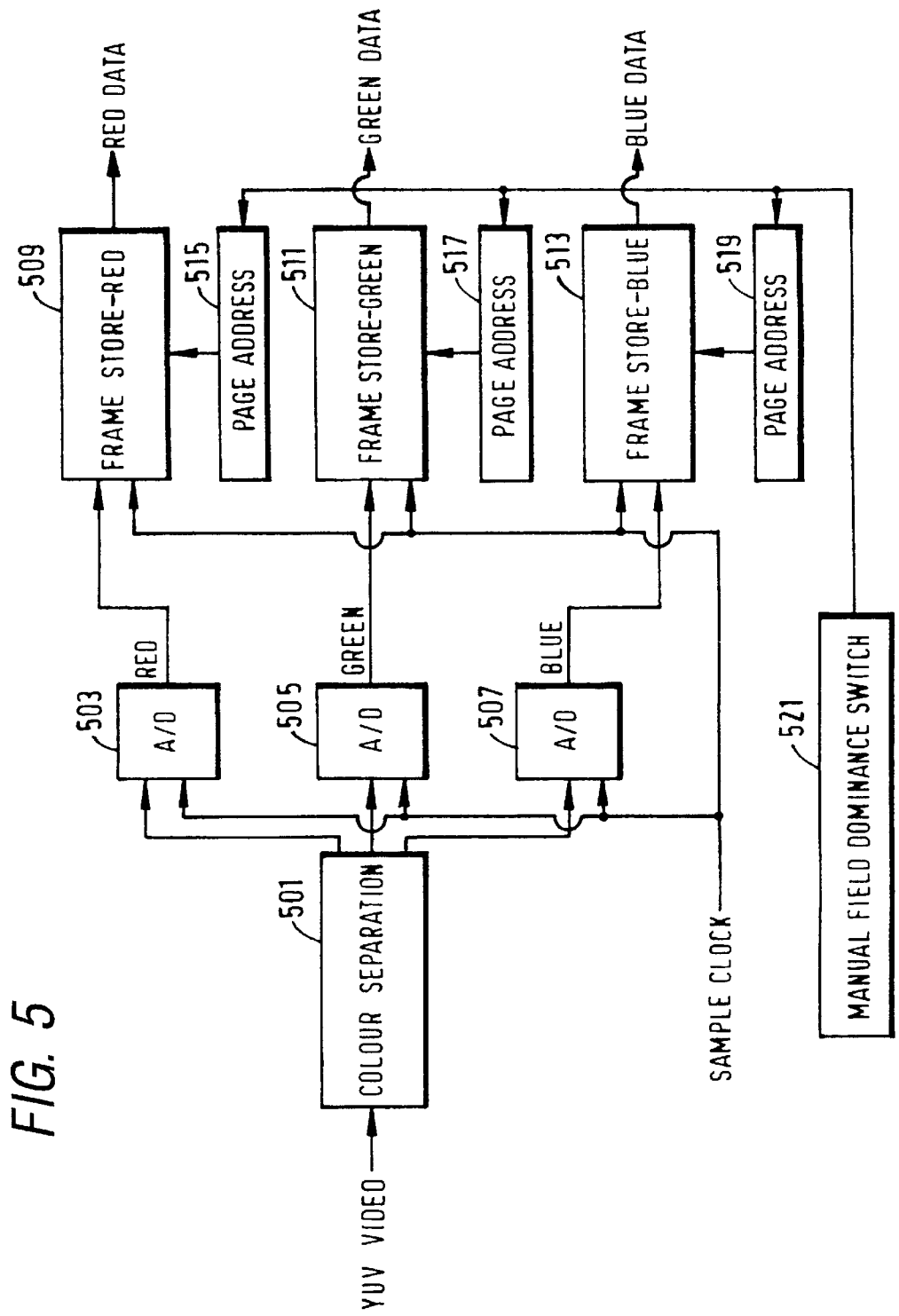
FIG. 5 illustrates circuitry for producing a modified interlaced to progressive scan conversion incorporated in a display apparatus in accordance with a first embodiment of the present invention.

Turning now to FIG. 5, in the display apparatus forming the first embodiment of the invention to be described, the interlaced YUV video signal output of the telecine scanner with clock signals at the pixel sample rate is converted into red, green and blue primary colour channels by separation unit 501, data within each colour channel being entered into a respective analogue to digital converter 503, 505, 507 in order to provide a digital signal representative of the required values of each of the pixels of the image to be displayed for each primary colour. In an alternative arrangement, the separation into the three primary colour channels may be performed digitally after the YUV signal from the telecine scanner has been digitised. The three separate digital signal outputs from the analogue to digital converters 503, 505, 507 within the three separate primary colour channels red, green and blue are entered into respective frame stores 509, 511, 513 each effective to store three successive fields of data whilst being loaded with a fourth field of data. Each frame store 509, 511, 513 is under the control of a respective page address system 515, 517, 519.

The apparatus is designed such that successive pairs of interlaced fields are combined into single frames of data, with pairs of fields not being derived from the same film stock frame 203 in FIG. 3 being identified and not displayed, thus avoiding the problems of the prior art systems. This is achieved as follows: As the leading field produced by the telecine scanner can be "odd" or "even" dependent on how the telecine scanner has been set up, it is possible that "even" and "odd" fields of data from successive frames, for example "1 EVEN" and "2 ODD" may be combined rather than the required pairs of data "1 ODD" and "1 EVEN", or "2 ODD" and "2 EVEN" etc originating from the same film frame 303. If the field dominance is such that fields of data from different frame 303 of the film stock 301 are combined, the display system will display an image of poorer characteristics than that obtained where the pairs of fields are derived from the same frame 303 of the film stock 301. The display apparatus is provided with a manual field dominance switch 521 which enables the user to make a choice between the two possible sets of combinations of successive fields, for example "1 ODD" and "1 EVEN", or "1 EVEN" and "2 ODD" etc in order to achieve the best projected image. Operation of the manual field dominance switch 521 causes a signal to be sent to the page address systems 515, 517, 519 provided in respect of each colour channel. The signals produced by the page address systems 515, 517, 519 inhibits the outputs by the respective frame stores 509, 511, 513 of the frame data corresponding to invalid field combinations derived from different frames of the film stock, whilst allowing the output of valid field combinations derived from the same film frames.

Figure 6:
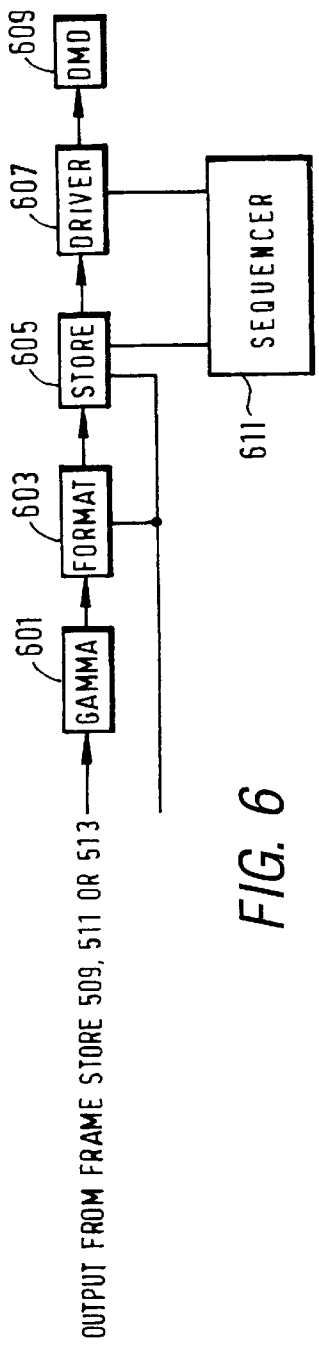
FIG. 6 illustrates further circuitry incorporated in a display apparatus in accordance with the first embodiment of the present invention for displaying the converted progressive scan data produced by the circuitry of FIG. 5 by a digital mirror device.

Turning now to FIG. 6, this figure shows the circuitry for one colour channel, the circuitry for the other two channels being identical. The output of each frame store 509, 511, 513 is applied to a respective gamma correction unit 601 effective to remove the gamma correction signal which is normally present in video signals for display on a cathode ray tube. The output of each gamma correction unit 601 is applied to a respective data formatting unit 603 effective to convert the word serial video input into a format suitable for addressing a digital mirror device responsive to light within the particular colour channel, including scaling the data to match the digital mirror device mirror array configuration.

The data formatting unit 603 is arranged to address alternately two frame stores 605, of which only one is illustrated in FIG. 6. Each frame store 605 in the address circuitry is arranged to store the video data for each mirror element of the digital mirror device array and to supply this data to the control electrodes of each mirror element within the digital mirror device 609 via the driver circuit 607 under the control of the sequencer 611.

The sequencer 611 is arranged to address the deformable mirror device with the data signals for each frame of data twice. If the film 201 progresses through the telecine machine at a rate of 25 frames per second, an output of 50 frames per second is thus produced, this double projection technique giving a "film feel" quality to the projected image.

The mirror elements of each digital mirror device may each have their own memory device or data latch effective to receive the input data signal prior to the signals being applied to the mirror drive electrodes. Alternatively groups of the mirror elements in the digital mirror device array, for example horizontal lines of the mirror elements, may be connected to a common memory device in which case it is necessary to apply reset signals (in this example) to the vertical rows of mirror devices in order to identify the correct mirror devices to be addressed by the data signals.

Each sequencer 611 may, if required, be arranged to apply appropriate reset signals to the electrodes of the respective digital mirror device 609 to enable the appropriate data signals to be applied to the chosen mirror elements within the digital mirror device. Whilst the frame store 605 is supplying data to the associated digital mirror array, the other frame store (not shown) is receiving fresh video data from the data formatting unit 603.

Figure 7:
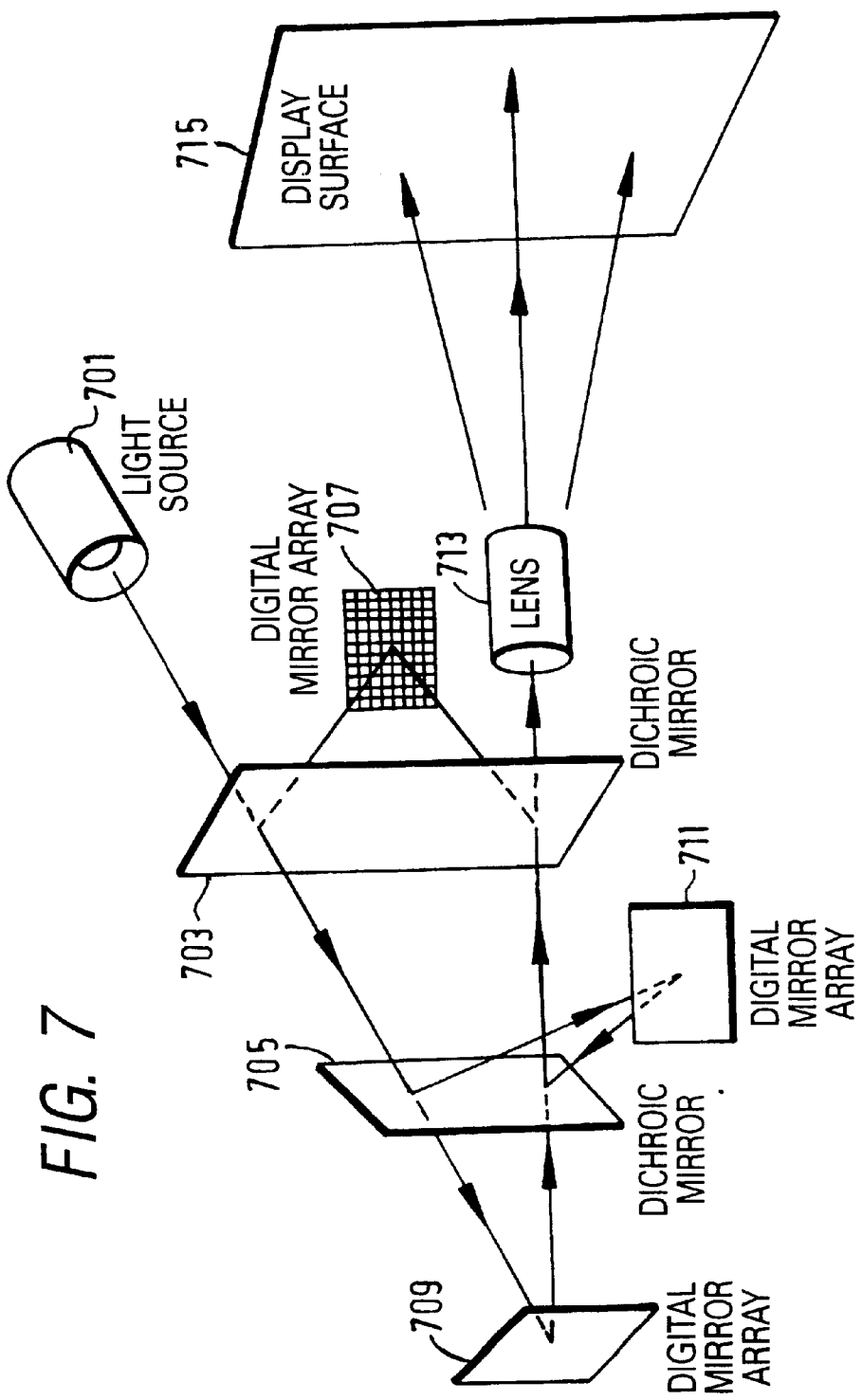
FIG. 7 is an overview of the optical system for the digital mirror devices of FIG. 6.

Referring now also to FIG. 7, each digital mirror device is illuminated with light of the appropriate primary colour red, green or blue to match the address signals produced from the appropriate frame store 605. This is preferably by means of a white light source 701, for example, a Xenon arc lamp, the light from which is directed through a series of colour selective dichroic mirrors 703, 705 to produce light of the appropriate colour on the red, green and blue digital mirror arrays 707, 709, 711. The spatially modulated light from the three arrays 707, 709, 711 is recombined at the dichroic mirrors 703, 705 and projected through a projection lens 713 onto a display surface 715. It will be appreciated that the optical arrangement shown in FIG. 7 merely illustrates the principle of operation of a projection system using the display apparatus to project an image on the display surface 715 and omits many optical features, for example beam shaping arrangements and a reflector in the green channel for equalising the number of reflections which the spatially modulated light undergoes.

As the digital mirror array is a binary device, i.e. the light reflected from each mirror to the projection screen is only "on" or "off" in order to display grey scale the mirrors of the device are switched "on" for different lengths of time corresponding to the light level to be displayed as signified by the input video signal. The way in which the various mirrors are turned "on" for different lengths of time is described, for example in our co-pending International Application WO 94/09473.

Figure 8:
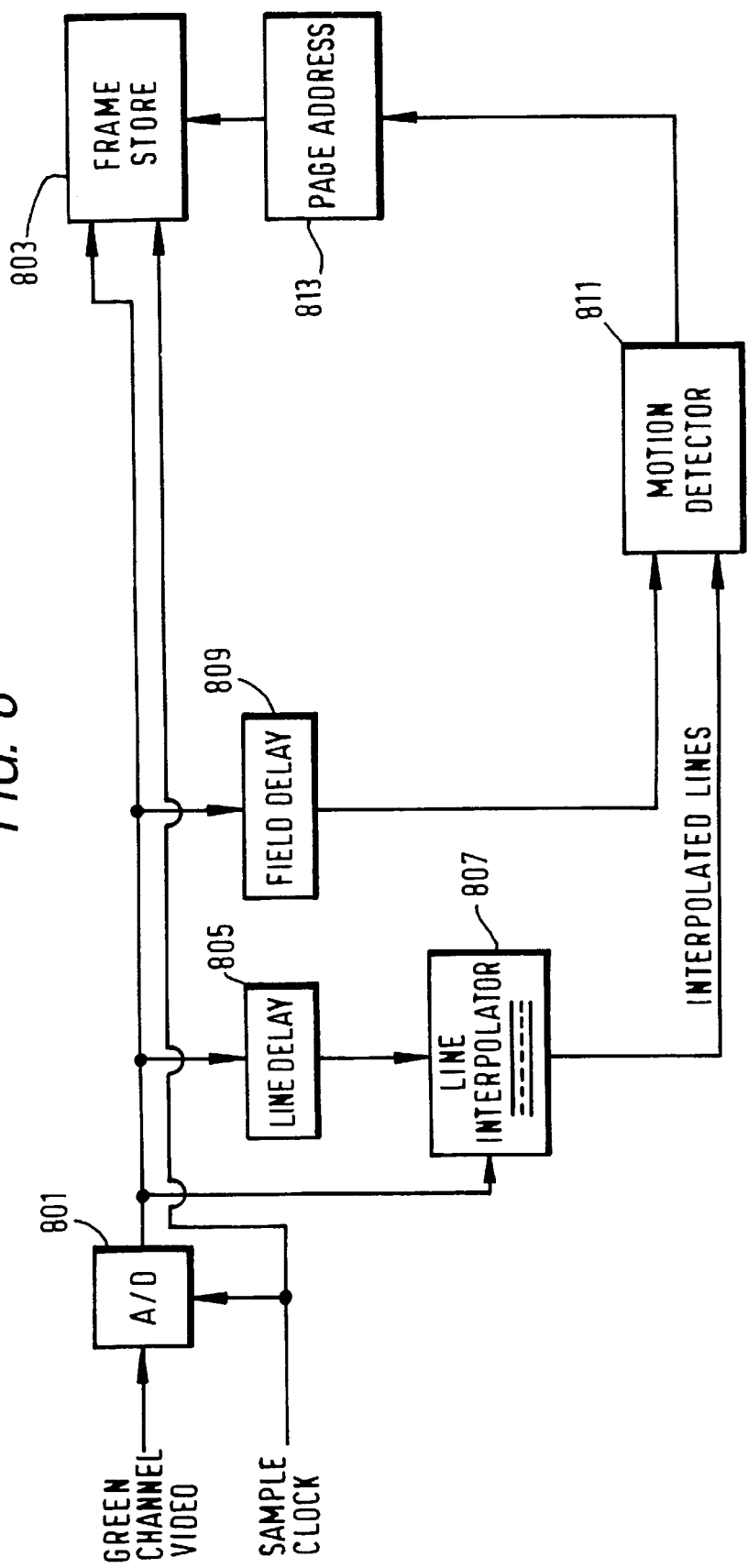
FIG. 8 illustrates schematically circuitry for producing a modified interlaced to progressive scan conversion incorporated in a display apparatus in accordance with a second embodiment of the present invention.

Whilst the above embodiment illustrates the general principle of the invention, it will be appreciated that the intervention of an operator to effect the switching of the manual field dominance switch 521 is inconvenient. FIG. 8 illustrates an embodiment of the invention in which the selection of the required combinations of fields from the input video signal is performed automatically by detecting motion between adjacent fields, using such motion to identify invalid combinations of pairs of fields which have been derived from different frames 303 of the film stock 301, and inhibiting display of images from the invalid combinations.

FIG. 8 illustrates the circuitry for only the green channel of the red, green and blue colour channels, equivalent circuitry being provided for the other two channels. As in the first embodiment, each of the red, blue and green colour channels of the input interlaced video signal output of the telecine scanner is applied to a respective analogue to digital converters 801 together with pixel sample clock signals, the digitised signals being applied to a respective frame store 803. However, in this embodiment pairs of fields originating from different frames 303 of the film stock 301 in FIG. 3 are identified, and prevented from being combined as will now be explained.

The output of the analogue to digital converter 801 is also applied to a line delay circuit 805, a line interpolator circuit 807 and a field delay circuit 809. An output from the line delay circuit 805 is also applied to the line interpolator circuit 807 which is effective to produce an interpolated line of data between the current line and the previous line of the same field of data. Thus, if the field is an "even" field, line numbers 2, 4, 6 etc being present, the line interpolator is effective to produce interpolated values for the "odd" field lines 3, 5 etc by forming averages of the pixel values for corresponding pixels in successive even lines of the input "even" field.

A motion detector 811 is effective to compare the values of the pixels in the interpolated lines with the values of the lines for the previous field of data. Thus, if for example, "odd" interpolated lines have been produced by the current "even" field, data from corresponding pixels in the interpolated lines are compared with the previous "odd" field data output from the field delay circuit 809. Likewise "even" interpolated data may be produced from a current "odd" field, and compared with the previous "even" field. By this means it is possible to determine whether there have been any changes between the interpolated lines of data corresponding to the current field and the lines of the previous field, such changes indicating that the fields have originated from different frames 303 of the film stock 301.

As in the first embodiment, enabling signals are input from the motion detector 811 to a page address circuit 813 for the frame store 803. The page address circuitry 813 is used to address the appropriate data in the store 803 such that the frame store 803 outputs the required combination of two fields of data from the same film frame 303 of the original film stock in order to provide a full frame of data to the digital mirror device 609. The further processing of the output of the frame store 803 is then carried out in similar manner to FIG. 6.

Thus by use of the circuitry illustrated in FIG. 8 it is possible to discriminate automatically between the sequences of "odd" and "even" fields of data in the interlaced video signal output of the telecine machine.

Figure 9:
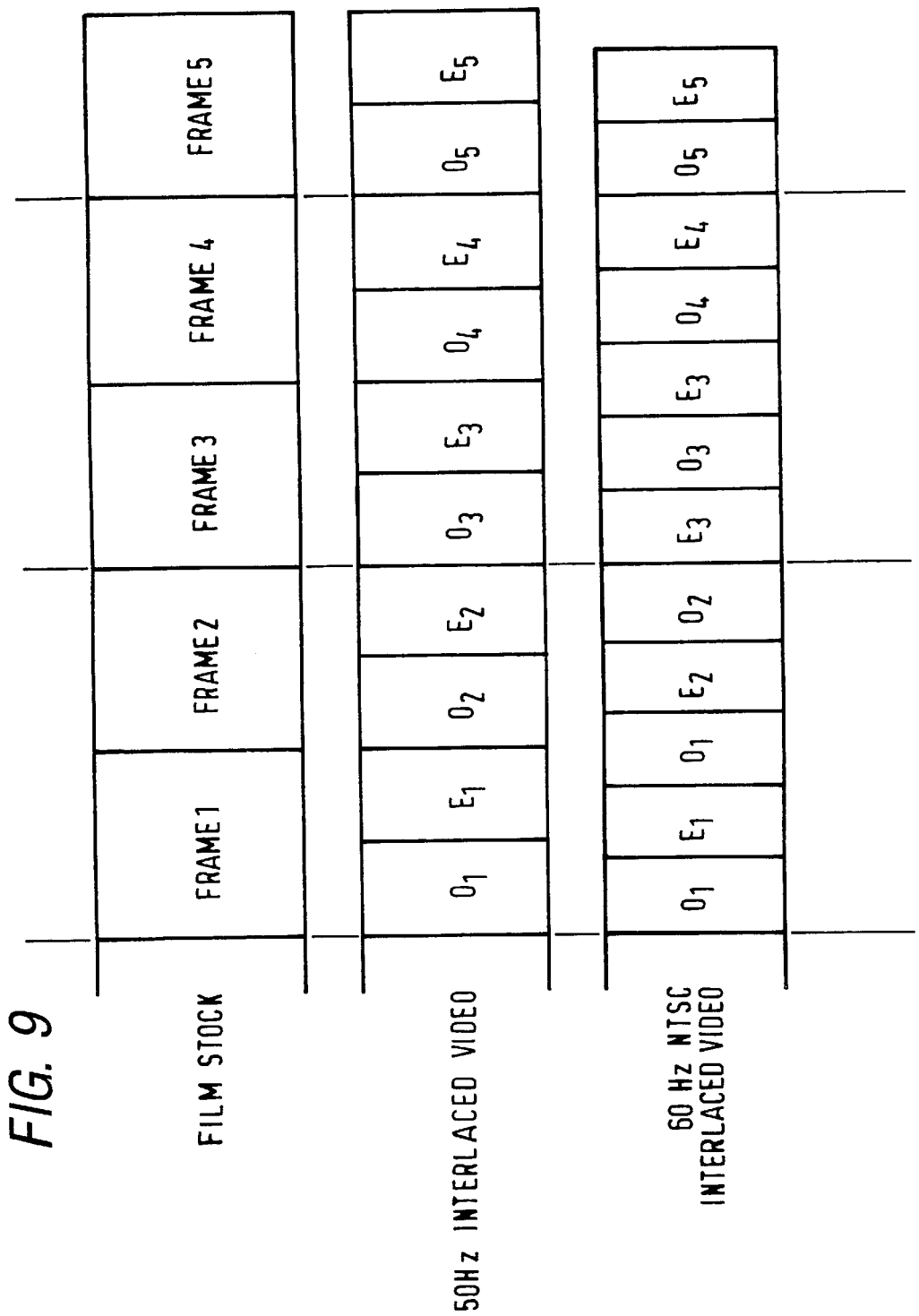
FIG. 9 illustrates a 60 Hz NTSC transmission signal.
Figure 10:
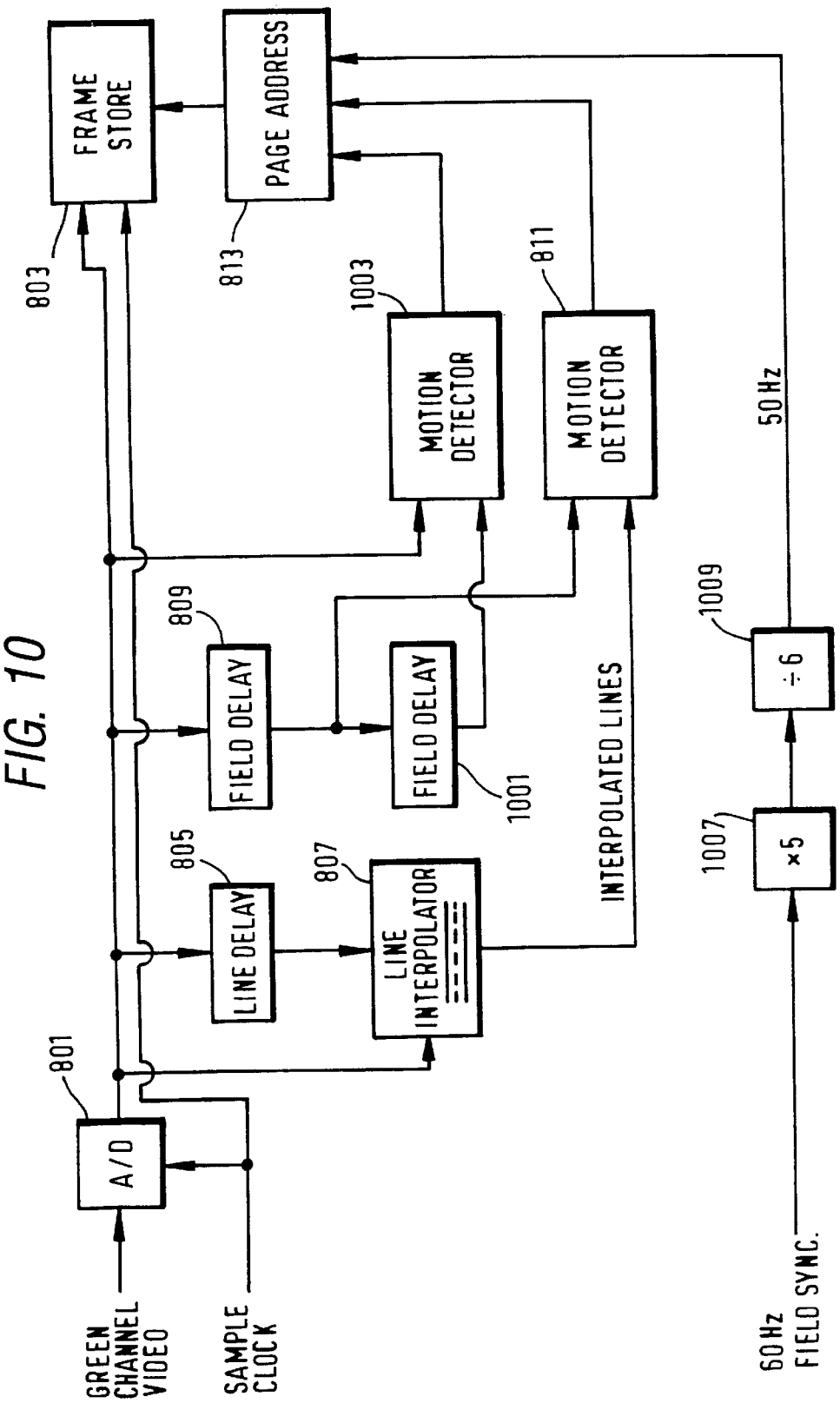
FIG. 10 illustrates schematically circuitry for producing a modified interlaced to progressive scan conversion incorporated in a display apparatus in accordance with a third embodiment of the present invention.

Turning now to FIGS. 9 and 10, this third embodiment of the invention to be described is an adaptation of the second embodiment but is additionally arranged to deal with the output of a telecine scanner which has been used to provide an output suitable for the American NTSC 60frames per second television standard. In order to produce this standard from a normal cinematographic film which has been shot at 25 frames per second, the telecine scanner is arranged to repeat every fifth field to produce an interlaced output at a 60 Hz vertical display rate. This is illustrated in FIG. 9 which shows the correspondence between the fields of the 60 Hz NTSC interlaced video signal with the 50 Hz interlaced video signal as has previously been described, and the frames of the film stock 203. As can be seen, the first "odd" frame $O_1$ is repeated in this particular example, followed by a repeat of the third "even" field $E_3$. As three fields are transmitted corresponding to the first frame of the film stock, followed by two fields corresponding to the next frame of the film stock, this is commonly referred to as 3:2 film pull down in the telecine.

Turning now to FIG. 10 in which again the circuitry for one colour channel is shown, in order to deal with such video signal input, fields of data which are repeated are identified and not displayed by the digital mirror devices.

FIG. 10 is an adaptation of the circuit shown in FIG. 8 and thus corresponding features are correspondingly labelled. However, in addition to the circuit of FIG. 8, the circuit of FIG. 10 includes a further field delay circuit 1001, a further motion detector circuit 1003, a times five multiplier circuit 1007 and a divide by six divider circuit 1009.

As in the previous embodiment, the line interpolator 807 is arranged to produce spatially interpolated lines to enable comparison with corresponding lines in the preceding field to determine field dominance and thus prevent combinations of fields originating from different frames 303 of the original film stock 301. The second field delay circuit 1001 and motion detector 1003 enables comparison of a two field delayed field of data with the present field of data to determine whether the field has been repeated.

If the motion detector 1003 detects no motion between the current field and the twice delayed field, then the current field is discarded. Otherwise the circuit operates as for the second embodiment described with reference to FIG. 8.

It will be appreciated that the only valid combination of fields of data will be produced when the motion detector 811 detects no difference between the interpolated lines of the current field and the previous field, and the motion detector 1003 detects a difference between the current field and the twice delayed field. The times five multiplier 1007 and divide by six divider 1009 produces the required 50 Hz input signal to the page address system 813 for clocking the frame store 803. The output of the frame store 803 is applied to the digital mirror device address circuitry 601 to 611 of FIG. 6 as described in relation to the first and second embodiments.

It will be appreciated that whilst the apparatus described above is described in relation to a single colour channel, in an apparatus in which a single digital mirror device is provided for each primary colour channel the invention is also applicable to a monochrome system or to a display apparatus incorporating a colour wheel in which red, green and blue data is applied sequentially to the same digital mirror device array. Such a colour wheel may be implemented electronically by use of one or more auxiliary digital mirror devices used as colour switches as described in our co-pending International application WO97/20242.

It will also be appreciated that the apparatus of FIG. 5 incorporating a manual field dominance switch can be adapted for use with an incoming 60 Hz NTSC signal in similar manner to that of FIG. 10, by including a motion detector for identifying fields which have been repeated, and suppressing such fields.

What is claimed is:

1. A display apparatus comprising:
   means for inputting an interlaced video signal comprising data signals representative of successive fields of image data;
   a spatial light modulator system electrically addressable by signals representative of said video signal;
   means for determining from said data signals whether successive pairs of fields of image data are derived from respective successive single frames of the image frames;
   and address means effective to address said spatial light modulator system only with signals representative of said pairs of fields of image data which are determined to be derived from said respective successive single frames such that the spatial light modulator system produces successive images representative of respective successive image frames, wherein said means for determining comprises a manually operable field dominance switch means operative to select pairs of fields for addressing the spatial light modulator system during each frame interval dependent on an observer's perception of the image produced by the spatial light modulator system.

2. A display apparatus according to claim 1, in which said interlaced video signal includes periodic repeated fields, wherein said determining means is arranged to determine image data corresponding to pairs of repeated fields, and said address means is arranged such that the spatial light modulator system is addressed with signals representative of only one of each pair of repeated fields.

3. A display apparatus comprising:

means for inputting an interlaced video signal comprising data signals representative of successive fields of image data;

a spatial light modulator system electrically addressable by signals representative of said video signal;

means for determining from said data signals whether successive pairs of fields of image data are derived from respective successive single frames of the image frames;

address means effective to address said spatial light modulator system only with signals representative of said pairs of fields of image data which are determined to be derived from said respective successive single frames such that the spatial light modulator system produces successive images representative of respective successive image frames;

wherein said means for determining comprises a motion detection circuit comprising:

(i) means for inputting successive portions of data, successive pluralities of the portions together forming successive ones of said plurality of successive fields of image data;

(ii) means for forming successive interpolated portions of each field of image data based on the previous and current portions of data; and (iii) means for comparing each interpolated portion of successive fields of data with the corresponding portion of data in the previous field of data to determine whether motion has occurred between the compared portions of data, thereby determining whether the current field and previous field are derived from a single image frame.

4. A display apparatus according to claim 3, wherein said portions are lines of image data.

5. A display apparatus according to claim 3, in which said interlaced video signal includes periodic repeated fields, wherein said determining means is arranged to determine image data corresponding to pairs of repeated fields, and said address means is arranged such that the spatial light modulator system is addressed with signals representative of only one of each pair of repeated fields.

6. A display apparatus according to claim 5, wherein said motion detection circuit further comprises:

means for comparing each current field of data with a second previous field of data; and means for causing the spatial light modulator system to produce an image from the current field of data only when the interpolated portions show no motion with respect to the portion of data from the previous field and the current and second previous fields show motion.

7. A display apparatus according to claim 5, wherein the interlaced signal is a 60 Hz 3:2 pull-down signal, and the apparatus includes means for clocking the address means such that the spatial light modulator system is arranged to produce successive images at 50 Hz.

8. A display apparatus according to claim 1, or 3, wherein said address means is arranged to cause said spatial light modulator system to produce an image representative of each frame of data at least twice.

9. A display apparatus according to claim 1, or 3, wherein the spatial light modulator system comprises a digital mirror device.

10. A display apparatus according to claim 1, or 3, wherein a spatial light modulator system and an associated address means is provided in respect of each one of several colour channels.

11. A display apparatus according to claim 1, or 3, including means for supplying image data representative of different colours sequentially to the same spatial light modulator system.

12. A display apparatus according to claim 1, or 3, in which said interlaced video signal is produced by a telecine apparatus.

13. A display system including a display apparatus according to claim 1 or 3 and a display surface.

14. A display method using an electrically addressable spatial light modulator system, the method comprising the steps of:

inputting an interlaced video signal comprising signals representative of successive fields of image data;

determining successive pairs of fields of image data derived from respective successive single frames of the image frames;

and causing an address means to address said spatial light modulator system only with signals representative of said pairs of fields of image data derived from respective successive single frames of the image frames to produce successive images representative of respective successive image frames;

wherein said determining step comprises operating a manual field dominance switch effective to select pairs of fields derived from a single image frame dependent on an observer's perception of the image produced by the spatial light modulator system.

15. A display method according to claim 14, in which said interlaced video signal includes periodic repeated fields and including the step of determining image data corresponding to pairs of repeated fields, and addressing the spatial light modulator system with signals representative of only one of each pair of repeated fields.

16. A display method using an electrically addressable spatial light modulator system, the method comprising the steps of:

inputting an interlaced video signal comprising signals representative of successive fields of image data;

determining successive pairs of fields of image data derived from respective successive single frames of the image frames; and causing an address means to address said spatial light modulator system only with signals representative of said pairs of fields of image data derived from respective successive single frames of the image frames to produce successive images representative of respective successive image frames;

wherein said determining step comprises:
- (i) inputting successive portions of data, successive pluralities of the portions together forming successive ones of said plurality of successive fields of image data;
- (ii) forming successive interpolated portions of each field of data based on the previous and current corresponding portions of data; and
- (iii) comparing each interpolated portion of a field of data with the corresponding portion of data in the previous field to determine whether motion has occurred between the compared portions of data, thereby determining whether the current field and previous field are derived from a single image frame.

17. A display method according to claim 16, wherein said portions are lines of image data.

18. A display method according to claim 16, in which said interlaced video signal includes periodic repeated fields and including the step of determining image data corresponding to pairs of repeated fields, and addressing the spatial light modulator system with signals representative of only one of each pair of repeated fields.

19. A display method according to claim 18, wherein said determining step comprises:

comparing each current field of data with a second previous field of data;

and causing the spatial light modulator system to produce an image from the current field of data only when the interpolated portions show no motion with respect to the portion of data from the previous field and the current and second previous fields show motion.

20. A display method according to claim in 18, which the interlaced video signal is a 60 Hz 3:2 pull-down signal, and the method includes the steps of clocking the address means to cause the spatial light modulator system to produce successive images at 50 Hz.

21. A display method according to claim 14 or 16, wherein said addressing step is arranged to cause said spatial light modulator system to produce an image representative of each frame of data at least twice.

22. A display method according to claim 14 or 16, wherein the spatial light modulator system is a digital mirror device.

23. A display method according to claim 14 or 16, wherein a spatial light modulator system is provided in respect of each one of several colour channels.

24. A display method according to claim 14 or 16, in which image data representative of different colours is supplied sequentially to the spatial light modulator system.

* * * * *

UNITED STATES PATENT AND TRADEMARK OFFICE
CERTIFICATE OF CORRECTION

PATENT NO.     : 6,580,470 B1                                                              Page 1 of 1
DATED          : June 17, 2003
INVENTOR(S)    : Brian Eckersley et al.

It is certified that error appears in the above-identified patent and that said Letters Patent is hereby corrected as shown below:

Column 10,
Line 6, "interlaced signal" should read -- interlaced video signal --.
Lines 9, 13, 15, 19 and 23, "claim 1, or 3," should read -- claim 1 or 3, --.

Column 12,
Line 6, "claim in 18, which" should read -- claim 18, in which --.

Signed and Sealed this

Seventh Day of October, 2003

JAMES E. ROGAN
*Director of the United States Patent and Trademark Office*